United States Patent [19]

Baum

[11] Patent Number: 5,320,538

[45] Date of Patent: Jun. 14, 1994

[54] INTERACTIVE AIRCRAFT TRAINING SYSTEM AND METHOD

[75] Inventor: David R. Baum, Minneapolis, Minn.

[73] Assignee: Hughes Training, Inc., Arlington, Tex.

[21] Appl. No.: 950,114

[22] Filed: Sep. 23, 1992

[51] Int. Cl.⁵ .............................................. G09B 5/00
[52] U.S. Cl. ...................................... 434/307; 434/43;
    434/69; 434/234; 345/8; 395/152; 364/578;
    340/686; 348/123; 348/14
[58] Field of Search ..................... 434/38, 40, 69, 258,
    434/307, 308, 350; 340/686, 689, 705, 709;
    381/190, 205; 358/88, 93, 105, 229, 213.1, 248;
    455/89; 901/1; 73/299, 323, 379, 379.01;
    395/127, 135, 152, 154, 155, 161; 33/313, 366,
    377; 364/578; 273/856, DIG. 28; 345/7-9, 156,
    157

[56] References Cited

U.S. PATENT DOCUMENTS

| | | | |
|---|---|---|---|
| 4,046,262 | 9/1977 | Vykukal et al. | 901/1 X |
| 4,310,849 | 1/1992 | Glass | 358/88 |
| 4,322,744 | 3/1982 | Stanton | 358/94 |
| 4,688,037 | 8/1987 | Krieg | 434/43 X |
| 4,931,018 | 6/1990 | Herbst et al. | 434/234 |
| 4,988,981 | 1/1991 | Zimmerman et al. | 340/709 X |
| 5,177,872 | 1/1993 | Lewis et al. | 434/307 X |
| 5,184,319 | 2/1993 | Kramer | 364/806 |
| 5,185,561 | 2/1993 | Good et al. | 434/45 X |

OTHER PUBLICATIONS

"Virtual Environment Display System" by Fisher et al., ACM 1986 Workshop on Interactive 3D Graphics, Oct. 23-24, 1986, pp. 1-11.

"Interfaces for Advanced Computing" by Foley Scientific American, Oct. 1987 pp. 127-130, 132, 134 and 135.

Primary Examiner—Richard J. Apley
Assistant Examiner—Joe H. Cheng
Attorney, Agent, or Firm—Wanda K. Denson-Low

[57] ABSTRACT

The system includes a computer (20), a detector (40) for detecting and tracking head orientation and head movement of an individual, a pair of tactile gloves (42, 44) which are donned by the individual (51) for detecting and transmitting to the computer (20) as input data orientation and movements of the hands of the individual inserted in the tactile gloves (42, 44), a stereoscopic, head-mounted display (31), a subsystem for enabling the computer to generate a stereoscopic image of the training environment, a subsystem for causing the stereoscopic image of the training environment to be displayed and changed by the computer relative to input data received by the computer relating to the head orientation and head movement of the individual, relative to input data received by the computer relating to orientation and movement of the hands of the individual inserted in the tactile gloves, and relative to input data reflecting realistic changes in the training environment that would be perceived by the individual if interacting with an identical, non-simulated, training environment. An object (43) representative of a tool is adapted for transmitting tactile information to the computer (20). Sounds representative of the environment are transmitted to the individual (51) through the earphones (33). Vocal emanations of the individual are detected by a microphone (48). System peripheral items (31, 33, 40, 42, 43, 44, 48) are connected to the computer (20) by means of wires (60, 61, 62, 63, 64, 65). The computer (20) interfaces and incorporates an environment simulation and modeling subsystem (22), an image generation component (24), a user interface management component (26), and a component for formulating and transmitting instructional input (28).

8 Claims, 3 Drawing Sheets

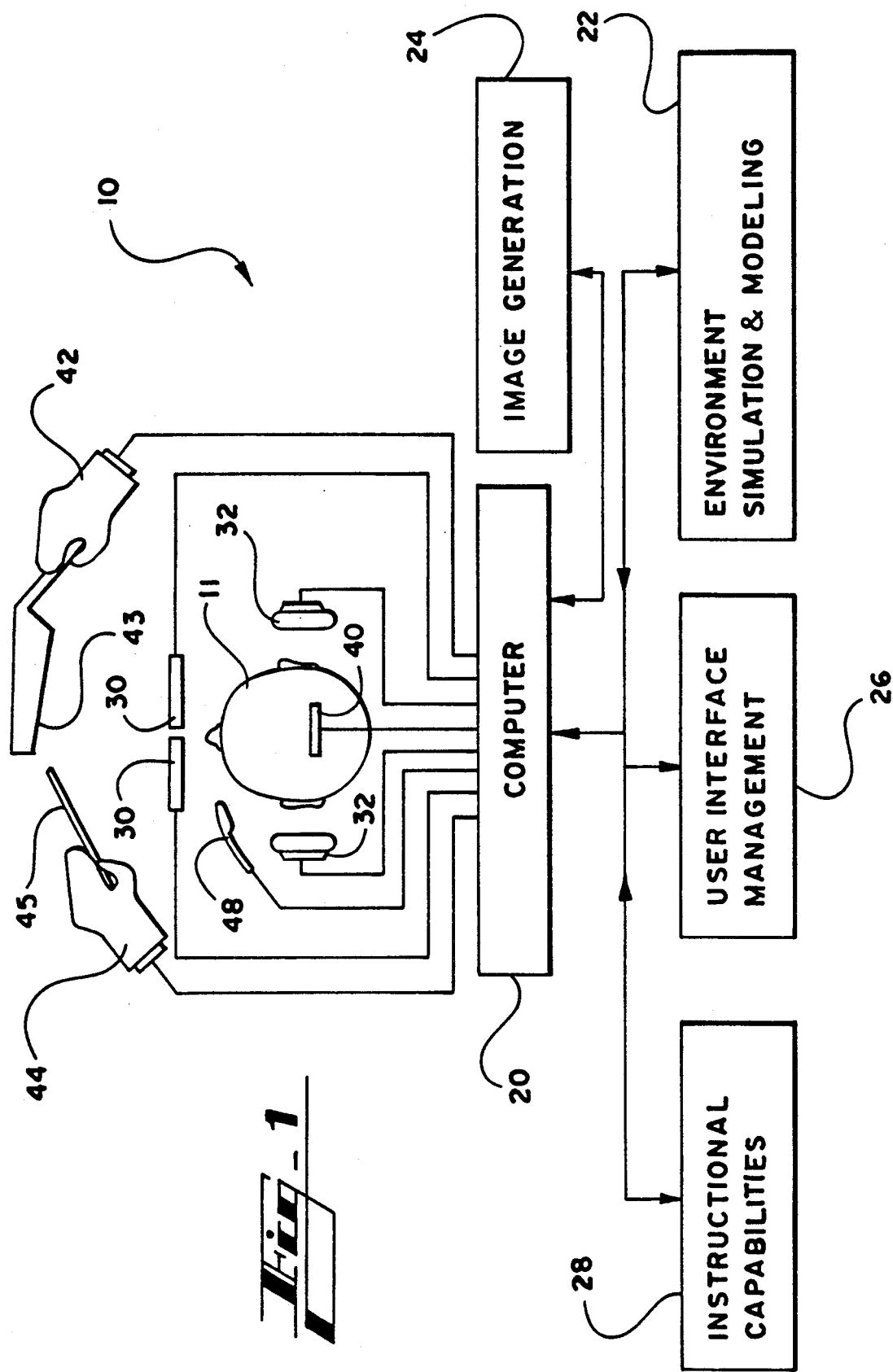

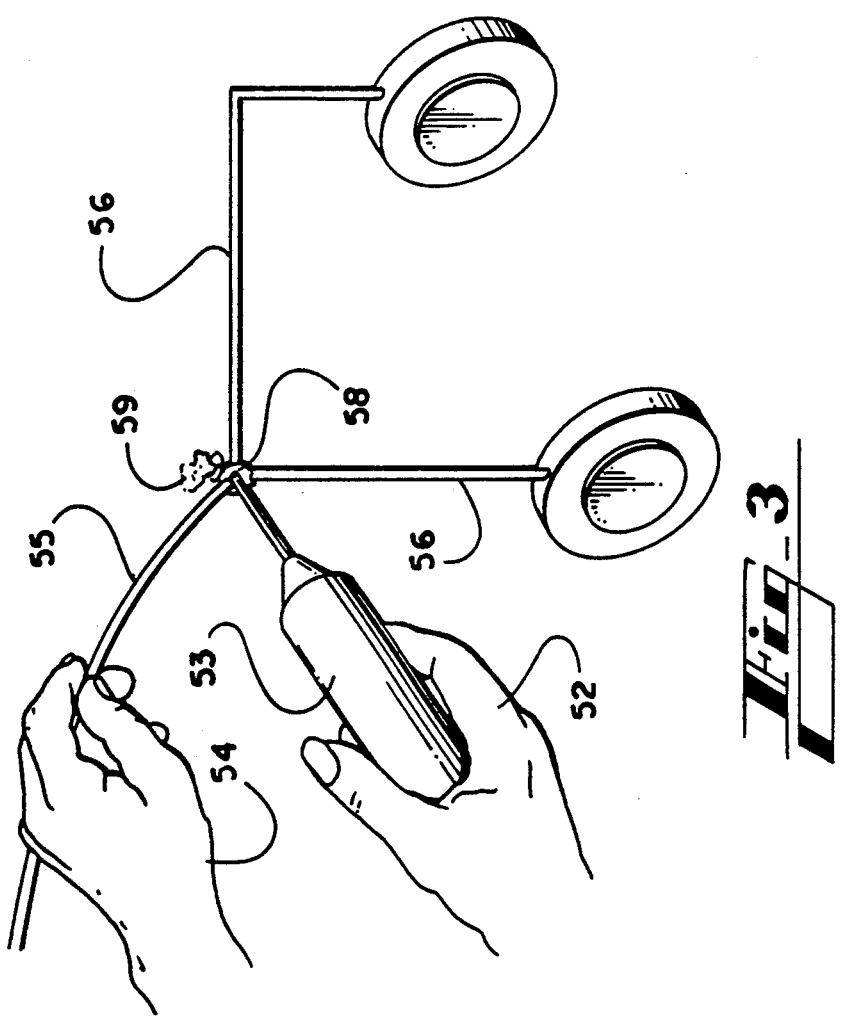
Fig_3
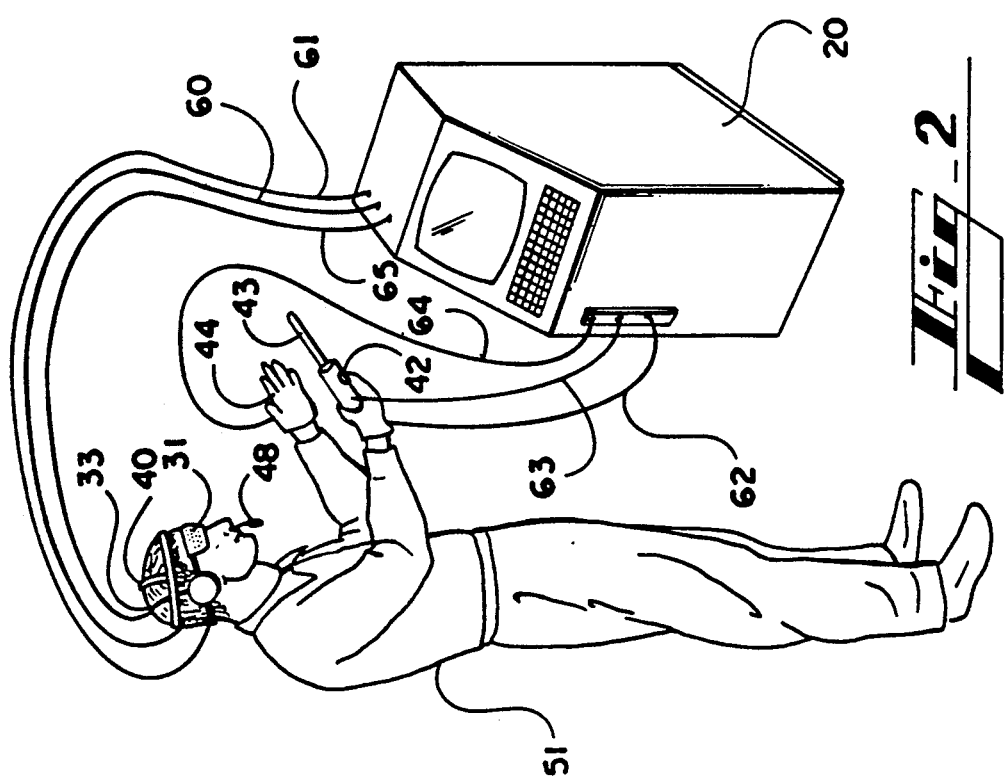
Fig_2

INTERACTIVE AIRCRAFT TRAINING SYSTEM AND METHOD

TECHNICAL FIELD OF THE INVENTION

The present invention relates to training systems and methods which incorporate a representation of an environment, and more particularly to a training system and method which incorporates a representation of environment, such as an aircraft, with which an individual may directly interact.

BACKGROUND OF THE INVENTION

To enhance the ability of an individual to perform a task it is helpful, and sometimes essential, to train the individual in an environment that resembles the real-life environment in which the task would be performed. Examples of tasks for which individuals may be effectively trained through the use of a training environment representing the real-life environment include piloting an aircraft, performing repair and maintenance work upon an aircraft or motor vehicle, manufacturing items, and performing military maneuvers.

A commonly-used method of training incorporates the physical recreation of a real-life environment such as an aircraft cockpit, aircraft or motor vehicle segments, a manufacturing facility or work station, or a military target, using sophisticated computer-generated imagery with complex training devices or simulation hardware. There are several disadvantages inherent in these prior art approaches. One disadvantage is the cost of physically recreating the environment. For example, it is very costly to recreate elements of an aircraft or other complex mechanical device. It also is very costly to recreate a geographic area which would be the subject of military maneuvers. The elements of cost include not only the acquisition costs of the recreated environment but also the cost of continued operation and support.

Another disadvantage in utilizing a physical recreation of an environment is that it is difficult to reconfigure the environment to provide different training experiences. For example, if the elements of an aircraft cockpit or vehicle machinery change substantially, it may be necessary to completely rebuild the mechanical environment rather than modify the existing physical structure.

Still another disadvantage of utilizing the prior art environments is that the physical structure may be difficult, or impossible, to move to a different training location or to disassemble and reassemble in a new location. For example, a flight stimulator may be too cumbersome to move to a training site at different geographic location or to place upon a naval vessel. There may often be a need to move the training environment in order to train new individuals or for refresher or upgrade training of previously trained individuals. In addition to the difficulty in moving the physical recreation of an environment, there may be also be a problem in re-locating the physical structure in an area where space is limited.

A further disadvantage of utilizing prior art systems is that training opportunities ma be limited due to constraints that naturally limit access to the recreated environment. For example, only one pilot trainee may use the physical recreation of an aircraft cockpit at a time. Constraints of an environment may also cause difficulties in recreating certain aspects of the environment or recreating certain aspects accurately. For example, in combat training, it may not be possible to recreate climatic and other environmental conditions of an environment. As another example, it would be extremely difficult, if not impossible, to recreate certain climatic or environmental conditions such as exposure to nuclear radiation or hazardous waste materials. It would likewise be extremely difficult, if not impossible, to create a structure wherein features of an environment, such as a landscape terrain, change during an exercise. This difficulty is particularly acute when the change that occurs in the environment is damage to the environment. The difficulty encountered is in accurately portraying the occurrence of and effect of damage and then subsequently portraying the undamaged environment for additional exercises.

In a more general sense, the physical constraints of an environment often limit the effectiveness of training through the use of a recreated environment because it is very difficult to create a model or structure that accurately depicts the real-life environment. It is important that the training environment resemble the real-life environment as closely as possible so that the individual performing tasks in the training environment will become accustomed to performing in a real-life manner. To optimize training, it is important that the training environment be realistically perceived in as many aspects as possible. Better training may be achieved if the environment is visually realistic. Training may be further optimized if elements of the environment may be interacted with in a realistic manner.

Thus it can be seen that prior art methods involve a number of physical and cost problems due to the size and complexity of these methods. As an alternative, another simpler method of training incorporates a graphic or pictorial recreation of an environment. For example, the pictorial recreation may be by means of a CRT monitor wherein a static or moving picture purports to recreate an environment. Training in this manner is undesirable because the recreated environment lacks realism and does not typically permit interaction therewith.

SUMMARY OF THE INVENTION

It is an object of the invention to provide a means for presenting a life-like recreation of an environment to an individual for training.

It is a further object of the invention to provide a means for presenting a life-like recreation of an aircraft environment and also providing a means for an individual to interact with the environment so presented.

In the present invention, an aircraft environment with which an individual may interact is created by first simulating elements of the environment so as to exhibit real-life changes in the environment in accordance with input data representing interaction of the individual with the elements of the environment. A realistic visual representation of the simulated aircraft environment and changes thereto is displayed to the individual. Physical actions of the individual in relation to the environment and changes in the environment are detected. The detected physical actions are converted to input data representing interaction of the individual with the elements of the environment. The individual's sensory perception of stimuli imparted by the environment is detected. The detected physical actions and sensory perception of the individual are converted to data representing the individual's response to the environment and changes thereto. The data representing the individual's response to the environment and changes thereto is assessed relative to predetermined parameters. Predetermined information based upon the assessment of the data representing the individual's response is communicated to the individual. The data representing the individual's response to the environment and changes thereto is communicated to the individual. Lastly, the assessment of the data representing the individual s response is communicated to the individual. In one embodiment, the system includes a computer, a monitor for detecting and tracking head orientation and head movement of an individual, a pair of tactile gloves which are donned by the individual for detecting and transmitting to the computer as input data orientation and movements of the hands of the individual inserted in the tactile gloves, a stereoscopic head-mounted display, a subsystem for enabling the computer to generate a stereoscopic image of the training environment, and a subsystem for causing the stereoscopic image of the training environment to be displayed and changed by the computer relative to input data received by the computer relating to the head orientation and head movement of the individual, relative to input data received by the computer relating to orientation and movement of the hands of the individual inserted in the tactile gloves, and relative to input data reflecting realistic changes in the training environment that would be perceived by the individual if interacting with an identical, non-simulated, training environment.

Other aspects, objects, features, and advantages of the present invention will become apparent to those skilled in the art upon reading the detailed description of preferred embodiments.

BRIEF DESCRIPTION OF THE DRAWINGS

FIG. 1 is an interactive training system according to one embodiment of the invention.

FIG. 2 is an interactive training system according to another embodiment of the invention.

FIG. 3 is a scene displayed in the interactive training system of FIG. 2.

DESCRIPTION OF PREFERRED EMBODIMENTS OF THE INVENTION

Figure 4:
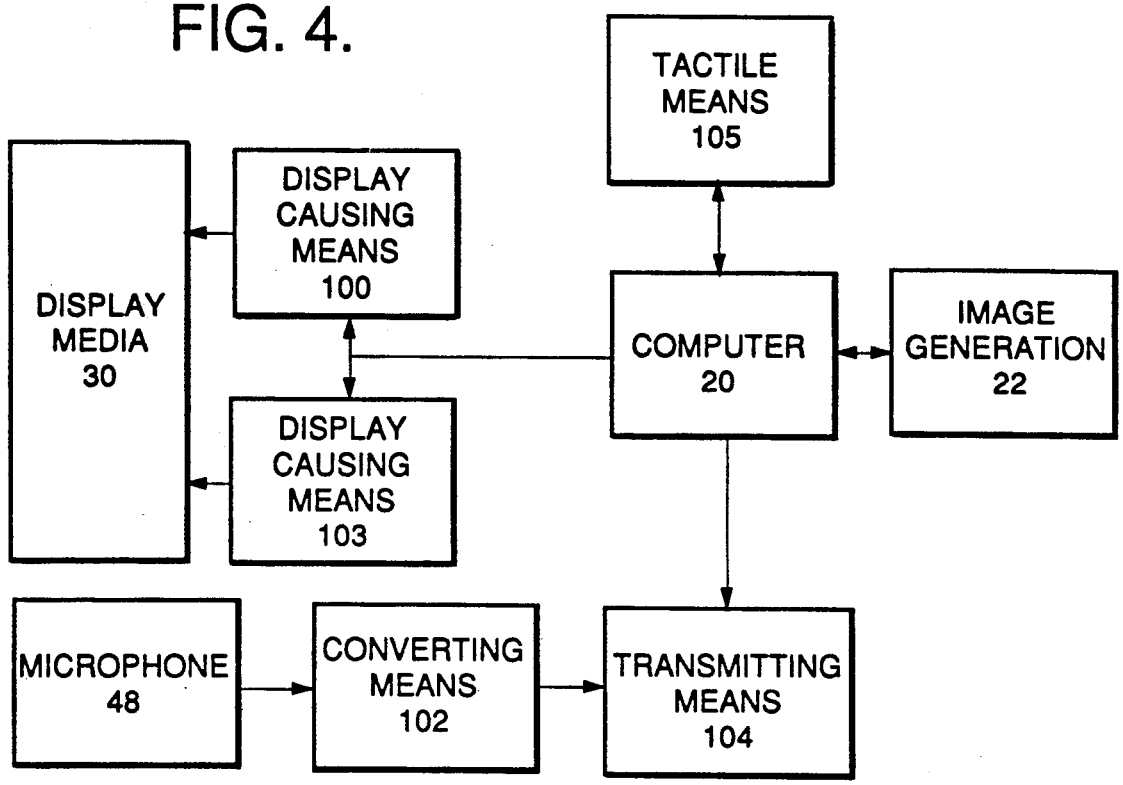
FIG. 4 is a block diagram of the interactive training system.

The invention is an interactive training system that utilizes a computer-generated life-like recreation of an aircraft environment as a setting for interaction of an individual with the environment and with changes in the environment. The invention creates a virtual environment, that is, one that gives the user a feeling of being immersed in the computer-generated environment. Rather than utilizing hardware-intensive physical recreations of an environment or two-dimensional graphic depictions of an environment as the training setting, the invention combines a three-dimensional depiction of a subject environment with other interactive features to provide a realistic training experience. The invention takes advantage of advances made in the development of computer software and hardware through artificial intelligence research. In the description and examples which follow, the term "environment" is used broadly to encompass physical settings, such as an aircraft cockpit, serviceable aircraft or other aircraft segment and motor vehicle components, a manufacturing facility work station or terrain or battlefield environment.

While the specification concludes with claims particularly pointing out and distinctly claiming the subject matter which is regarded as the present invention the invention will now be described with reference to the following description of embodiments taken in conjunction with the accompanying drawings.

In the description which follows, reference will be first made to FIG. 1, which is an illustration of an interactive training system 10 according to a preferred embodiment of the invention. The training system 10 utilizes a combination of components and subsystems to impart certain information to at least one individual 11, receive information from that individual 11, process the information received from the individual 11, and, in turn, impart and receive additional information. The setting with which the individual 11 is to interact must first be created. Elements of a subject environment are defined, assembled and prepared for presentation to the individual 11. A computer 20 is the central component of the system 10. The computer 20 utilizes an environment simulation and modeling subsystem 22 to simulate the elements of the subject environment. This subsystem may include commercially-available image databases and associated imaging software that are capable of defining features of an environment. The features of the environment to be recreated include structure and features of the setting, such as the instrument panel and window of an aircraft cockpit, or an engine of an aircraft, or foliage and hills of a terrain. Recreated elements of the environment may also include objects in the setting that respond to changes imparted to the environment or that may be directly acted upon by the individual 11. Objects may include the throttle or other controls of an aircraft cockpit, bolts of an aircraft engine, a tool for manipulating bolts of an aircraft engine, a rock, animal or simulated person upon a terrain, or a weapon to be discharged upon a terrain. The simulation and modeling subsystem 22 is generally computer software that is capable of compiling and processing data which defines objects to be presented in the subject environment. The data base of the simulation and modeling subsystem 22 also contains information on the physical laws and relationships governing objects in the environment. For example, the database defines what happens when a tool applies too much torque to a bolt or what happens when an object is subjected to forces that cause metal fatigue or fracture. Another example of a physical relationship which can be modelled in the simulation and modeling subsystem 22 is the reaction of objects upon a terrain to an explosion or nuclear radiation. The behavior of a simulated individual can also be defined by the simulation and modeling subsystem 22.

Once the environment is defined, it must be presented to the individual. The predominant sense affected in most training exercises is sight. The computer 20 works in conjunction with the simulation and modeling subsystem 22 and an image generation subsystem 24 to produce a life-like image that is presented to the individual through display media 30. Image generation by the image generation subsystem 24 may be achieved through programs and databases like those used in CAD systems. The display media 30 illustrated is a stereoscopic vision system such as a miniature screen and filter that produces an image to each eye. The resulting image exhibits stereopsis, motion, and occlusion, which are characteristics of a life-like environment having depth. The display media 30 may be made to move with the line of vision of the individual by installing the display media 30 in a helmet, goggles, visor or eyeglasses to be worn by the individual 11. A device for tracking head movement 40 senses head movement and transmits data representing the individual's 11 head movement to the computer 20 and related components to be processed with other data supplied. A user interface management component 26 helps process data relating to head movement. The computer 20, simulation and modeling subsystem 22 and image generation subsystem 24 cause the image presented to the individual to change as the head of the individual 11 moves. Thus, as the individual moves his or her line of vision from side to side, the image presented pans accordingly. An aural dimension is added to the simulated environment through the use of speakers 32.

Figure 5:
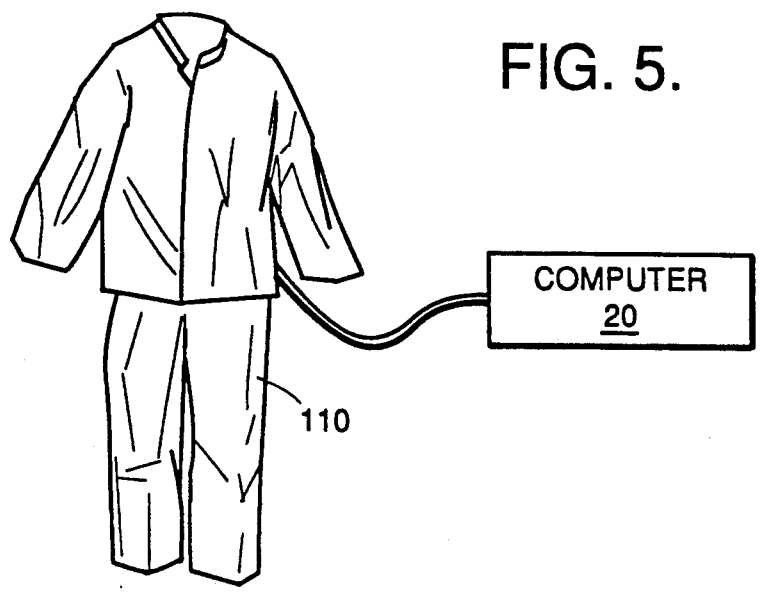
FIG. 5 is a tactile body suit of the interactive training system.

The first two facets of the interactive training system, namely, simulation and display, primarily relate to presentation of the subject environment. The third facet relates to the interaction of the individual 11 with environment and system 10. The interaction of the individual will be manifested in behavior exhibited by the individual 11 and sensory perception of the individual 11 to the simulated environment. Both of these manifestations are detected and transduced into input data by the system 10. FIG. 1 illustrates several components which detect and help transduce exhibited behavior and sensory perception. Behavior to be detected and transduced can generally be grouped as the modalities of movement, manipulation and speech. The head tracking component 11 previously mentioned detects and helps transduce head motions of the individual 11. A means for detecting body motion, such as a tactile body suit, may also be used but is not illustrated in the preferred embodiment of FIG. 1. (A tactile body suit 110 is shown in FIG. 5) Instead, components which encompass movement of the hands of the individual 11 and manipulation of objects in the environment by the hands are illustrated. A glove 42 adapted for tactile and force feedback detects the general movements of the individual's 11 hand inserted in the glove 42. The glove 42 also detects movement of the individual's 11 hand relative to a defined object in the environment and further detects the inserted hand's manipulation of the defined object. Detection of manipulation is aided through the use of a real-life object 43 handled by the gloved 42 hand The real-life object 43 engaged allows the individual to react in a realistic manner to a generated image which is to be engaged in the exercise. A second glove 44 tracks the movement of a hand inserted therein. In the illustration of FIG. 1, the second gloved 44 hand manipulates the image of a tool 45. The preferred embodiment illustrated demonstrates the use of one glove 42 to engage a real object 43 while the individual views and manipulates an image and the use of the second glove 44 to manipulate only an image. However, the system 10 may be used with both gloves 42, 43 manipulating a real object 43 or with both gloves manipulating only images of tools 45 or other objects. The user interface component 26 incorporates data which may be termed "metaphors" which helps to interpret the detected movement of the head tracking device 40 or the detected movement and manipulations of the gloves 42, 44. For example, although head movement may directly map into a change of viewpoint in the image of the environment generated, the meaning of movement of a hand inserted in a detecting glove 42, 44 may have to be interpreted relative to a given circumstance. Several technologies may be used to sense position changes, including electro-optical, magnetic, acoustic and image processing. Finger sensing gloves, in which individual movements of and pressures exerted by individual fingers on a hand are detected, may be used for the gloves 42, 44 in order to produce more detailed response data. In addition to, or as an alternative to, a sensing glove 42, 44, a representative device which is manipulated by the hand of an individual may be adapted for transmitting its detected movement to the system. For example, in a flight training exercise a joystick which transmits to the computer 20 its movements and the manner in which it is manipulated may be used. As another example, the object 43 may be adapted to receive and transmit the manner in which it is manipulated. The object 43 so adapted produces data in a manner similar to that in which the glove 42, 44 detects actions. Another manner in which input data may be derived relative to the actions of an individual is through the use of a tactile body suit (mentioned briefly above) which detects and monitors the orientation and movements of selected body parts in a manner similar to that in which hand motions are detected and monitored.

Speech of the individual is detected by a microphone 48. In the context of the invention, speech is meant to include not only spoken words but other vocal emanations. At least one of two system components, namely, the computer 20 and user interface component 26, will have a speech recognition sub-component to transduce speech into input data. Transduced speech data triggers a response by the system that translates into the occurrence or non-occurrence of an event. As a simple example, the spoken word "begin" may be used to commence a training exercise. As a more sophisticated example, in a combat training exercise where silence is to be maintained, an utterance by the individual may translate into the presentation of an adverse occurrence such as an explosion. As another example, a training exercise presented to an individual may require that the trainee verbally communicate with an intelligent agent in the presented scenario. For example, a pilot trainee may be required to verbally communicate with a simulated air traffic controller or navigator.

A full range of sensory perceptions encompasses sounds, including speech, touch, force, smell and taste. In the preferred embodiment illustrated, the combined sensation of touch and force applicable to the hands is detected by the gloves 42, 44. Technologies which facilitate touch and force feedback include heat-sensitive metal alloys that exhibit resistance to a change in shape. The user interface management component 26 previously mentioned combines software and hardware capabilities to transmit and help process input data representing exhibited behavior and sensory perception of the individual.

The experience provided by the training system 10 is enhanced through the use of an instructional component 28. The instructional component 28, together with the other components of the system 10 (the display media 30 and aural media 32 in particular) provide data and capabilities for assessment of the individual's 11 performance and a means for communicating such assessment and other desirable information to the individual. The instructional component 28 may provide a structured curriculum of lessons and scenarios, or a performance measurement and after action review. The instructional component may be used in an exercise to provide, in combination with other components described above, intelligent agents (including missing team members or instructors), instructor interaction (and intervention if necessary), performance recording and playback, and performance feedback or evaluation.

The teachings of the invention may be used in a variety of training exercises. In general usage, the trainee would don appropriate gear, initialize the system and then commence the training exercise. The system may be initialized by inserting a data card carrying information identifying him and his training history with the system. The system would present appropriate initial condition and lesson information. After selections are made via voice interaction and confirmation, the technician trainee is instantly immersed in a three-dimensional environment. He would proceed to troubleshoot, repair and test a particular subsystem or component. All of his interactions would be directly on or with the simulated aircraft, equipment and tools. In a cooperative troubleshooting situation, another trainee would interact with him through voice communication; this partner could be real or simulated. This type of application might be particularly beneficial for training the repair of aircraft battle damage or other repairs involving structural or mechanical features that are normally inaccessible.

Referring now to FIG. 2 for a more specific training example, in using the system 10 to produce an aircraft maintenance training environment, the individual 51, or trainee, dons a stereoscopic visor or pair of goggles 31, a head-movement monitor for detecting and tracking head movement 40, a headset containing stereophonic earphones 33 and a microphone 48, and instrumented gloves 42, 44. An object 43, representative of a soldering iron in the training exercise depicted, is adapted for transmitting tactile information to the system 10. The gloved hand 44 is shown poised to manipulate solder for a soldering repair training exercise. Prior to or after donning the system articles, the trainee may initialize the system 10 by inserting a data card carrying information identifying him and his training history with the system. The system would present appropriate initial condition and lesson information. After selections are made via voice interaction and confirmation, the technician trainee is instantly immersed in a three-dimensional environment. In FIG. 2, the environment is an aircraft part that needs repair requiring soldering. The individual is able to visually locate the work area in the simulation by panning his head. The head movements are detected by the head motion detector 40 which in turn produces input data causing the displayed image to change accordingly as described above. Referring now also to FIG. 3, as seen through the visor or goggles 31, there appears before the individual 51 right and left hands 52, 54, respectively, a soldering iron 53 (corresponding to the tactile object 43 actually held by the individual), solder 55 held by the left hand 54, aircraft parts to be soldered 56, melted solder 58, and gases and sparks 59 created as a result of soldering. Sounds representative of the environment or simulating the sounds of a soldering are transmitted through the earphones 33. Oral instructions or feedback may also be transmitted through the earphones 33. As the individual 51 manipulates his left gloved hand 44 the solder 55 is moved into or out of position for soldering. Placement and handling of the tactile object 43 representing the soldering iron 58 is displayed in the simulated image. The system peripheral items 31, 33, 40, 42, 43, 44 and 48 may be connected to the computer 20 by means of wires 60, 61, 62, 63, 64, and 65. Wireless connections may be used to create a less inhibitive system 10.

FIG. 4 shows means 100 for causing the stereoscopic image of the training environment to be displayed and changed by the computer 20 relative to the input data received by the computer 20 representing orientation and movement of the predetermined body parts of the individual through the tactile means 105; means 102 for converting the vocal emanations of the individual into input data, means 104 for transmitting to the computer 20 the input data of vocal emanations of the individual and means 103 for causing the stereoscopic image of the training environment to be displayed and changed by the computer 20 relative to the input data received by the computer 20 relating to vocal emanations of the individual.

The interactive training system provides all of the benefits of a physically-recreated environment or a two-dimensionally simulated environment plus reduced hardware costs, a high degree of portability and opportunities to train for tasks that require individual movement through an environment. Another advantage of the invention is that several individuals may access the same or identical environments simultaneously. Multiple access is possible because there are no physical constraints limiting access to the environment.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. An interactive training system comprising:
   a computer;
   means for detecting the head orientation and head movement of an individual;
   at least one tactile glove means for receiving a hand of the individual and for detecting and transmitting to said computer as input data representing orientation and movements of the hand of the individual inserted in said tactile glove;
   means for displaying a stereoscopic computer-generated image of a training environment to the individual;
   means for enabling said computer to generate a stereoscopic image of the training environment; and
   means for causing the stereoscopic image of the training environment to be displayed and changed by the computer relative to said input data received by said computer relating to the head orientation and head movement of the individual, relative to said input data received by said computer relating to orientation and movement of the hand of the individual inserted in said tactile glove means, and relative to input data reflecting realistic changes in the training environment that would be perceived by the individual if interacting with an identical, non-simulated, training environment,
   further comprising tactile object means to be grasped by an individual and adapted for detecting and transmitting to said computer as input data orientation of, movements of, and manipulation of said tactile object means, and further comprising means for causing the stereoscopic image of the training environment to be displayed and changed by the computer relative to said input data received by said computer relating to orientation of, movement of, and manipulation of said tactile object means.

2. The invention of claim 1, said at least one tactile glove means comprising two tactile glove means.

3. The invention of claim 1, further comprising a tactile means for detecting and transmitting to said computer as input data representing orientation and movement of predetermined body parts of the individual and further comprising means for causing the stereoscopic image of the training environment to be displayed and changed by the computer relative to said input data received by said computer relating to orientation and movement of predetermined body parts of the individual.

4. The invention of claim 3, said tactile means for detecting and transmitting to said computer as input data representing orientation and movement of predetermined body parts of the individual comprising a tactile body suit.

5. The invention of claim 1, further comprising a microphone for detecting vocal emanations of the individual, means for converting said vocal emanations of the individual into input data and means for transmitting to said computer said input data of vocal emanations of the individual, and further comprising means for causing the stereoscopic image of the training environment to be displayed and changed by the computer relative to said input data received by said computer relating to vocal emanations of the individual.

6. The invention of claim 1, said means for displaying a stereoscopic computer-generated image of the training environment to the individual comprising a stereoscopic, head-mounted display.

7. The invention of claim 1, further comprising means for conveying aural features of the training environment to the individual.

8. The invention of claim 7, said means for means for conveying aural features of the training environment to the individual comprising stereophonic earphones.

* * * * *